United States Patent
Paul

(10) Patent No.: US 7,221,477 B2
(45) Date of Patent: May 22, 2007

(54) METHOD FOR ADAPTING THE COLORS PRINTED BY A SECOND PRINTING SYSTEM TO THE COLORS PRINTED BY A FIRST PRINTING SYSTEM

(75) Inventor: Andreas Paul, Vaterstetten (DE)

(73) Assignee: Oce Printing Systems GmbH, Poing (DE)

(*) Notice: Subject to any disclaimer, the term of this patent is extended or adjusted under 35 U.S.C. 154(b) by 1028 days.

(21) Appl. No.: 10/208,446

(22) Filed: Jul. 30, 2002

(65) Prior Publication Data

US 2003/0048463 A1 Mar. 13, 2003

(30) Foreign Application Priority Data

Aug. 30, 2001 (DE) .................. 101 42 322

(51) Int. Cl.
*G06K 1/00* (2006.01)
*H04N 1/46* (2006.01)

(52) U.S. Cl. ............... 358/1.9; 358/1.1; 358/1.13; 358/504

(58) Field of Classification Search ............ 358/1.9, 358/1.1, 504, 518, 520, 523, 1.13
See application file for complete search history.

(56) References Cited

U.S. PATENT DOCUMENTS

| | | |
|---|---|---|
| 4,113,371 A | 9/1978 | Fraser et al. |
| 6,607,258 B2 * | 8/2003 | Jodra et al. .......... 347/15 |
| 6,633,408 B1 * | 10/2003 | Rozzi ............... 358/1.9 |
| 6,809,837 B1 * | 10/2004 | Mestha et al. ........ 358/1.9 |

FOREIGN PATENT DOCUMENTS

| | | |
|---|---|---|
| DE | 199 08 296 | 8/2000 |
| DE | 199 46 585 | 4/2001 |
| DE | 198 56 574 | 9/2001 |

OTHER PUBLICATIONS

Billmeyer and Saltzman's Principles of Color Technology—Third Edition—Berns p. 149-19.

* cited by examiner

*Primary Examiner*—Madeleine Nguyen
*Assistant Examiner*—Houshang Safaipour
(74) *Attorney, Agent, or Firm*—Schiff Hardin LLP

(57) ABSTRACT

In order to adapt the colors of a second printing system to those of a first printing system, the primary colors of the two printing systems that deviate from one another are first identified. Subsequently, the deviating primary colors of the second printing system are adapted to those of the first printing system in that parts of other primary colors are mixed to the deviating primary color to form a mixed primary color until an adequate similarity to the corresponding primary color of the first printing system has been achieved.

21 Claims, 3 Drawing Sheets

METHOD FOR ADAPTING THE COLORS PRINTED BY A SECOND PRINTING SYSTEM TO THE COLORS PRINTED BY A FIRST PRINTING SYSTEM

BACKGROUND OF THE INVENTION

In color reproduction in multi-color printing, different printing methods and printing systems as well, for example printers from different manufacturers and printing conditions, lead to different printed results. This means that, given the same driven color data (generally, surface coverage degrees CMYK), the colors that result in the printing often deviate substantially from one another. Often, however, the colors should not only correspond well to the original but should also coincide with the result that is obtained given a different printing method (or, respectively, printing system, printing conditions).

Examples of multiply employed data are:

Printing a small advance press run in addition to a large main press run.

Printing reprints when editions are out of print.

Newspaper notices wherein different printing systems and different papers are employed; here, too, the images should look the same.

The significant causes of the deviations are differences in the primary colors employed. Deviations in the tonal value transmission properties additionally play a part.

Up to now, the above problem was mainly solved by manual corrections of the image data or with color management systems. In color management, the printing system to be characterized is brought into a defined condition and the color transmission properties are then determined by measurement (printing and analyzing specific test patterns). Allocation tables between resulting colors (for example, CIELAB colors) and degrees of surface coverage can be determined therefrom. This allocation can be employed for converting later color data into degrees of surface coverage (Homann, Jan-Peter, *Digitales Colormanagement: Farbe in der Publishing-Praxis,* Berlin, Springer Verlag, 1998).

Disadvantages of these methods are that the allocation tables can only be applied for one status (printing conditions, material to be printed);

all image data must be converted device-independently; given printout on different printing systems, another adaptation of the complete dataset is respectively required. In addition to the considerable computing expense, it is especially disadvantageous that it must be assured that the device-dependent color allocations must be co-managed; and the determination of the allocation tables is only possible with the assistance of expensive measuring technology and software.

SUMMARY OF THE INVENTION

A problem underlying the invention is in specifying a method with which the colors of a second printing system can be cost-beneficially adapted to the colors of a first printing system. The colors of the first printing system are referred to as target colors below.

According to the method of the present invention for adapting colors printed by a second printing system to target colors printed by a first printing system, color data of the primary colors of the first printing system are determined. The primary colors of the second printing system are set. The primary colors are printed out by the second printing system. The color data of the printed primary colors of the second printing system are measured. A determination is made as to whether the color data of the target primary colors of the first printing system coincide with the color data of the primary colors of the second printing system. Given deviation of the color data of individual target primary colors of the first printing system from the color data of the primary colors of the second printing system, primary colors of the second printing system deviating from the primary colors of the first printing system are respectively modified to a mixed primary color. Upon employment of the mixed primary color is a primary color of the second printing system, implementing the steps of setting the primary colors through the respective modifying of the primary colors of the second printing system until a prescribed criterion has been met.

DESCRIPTION OF THE PREFERRED EMBODIMENTS

Figure 1:
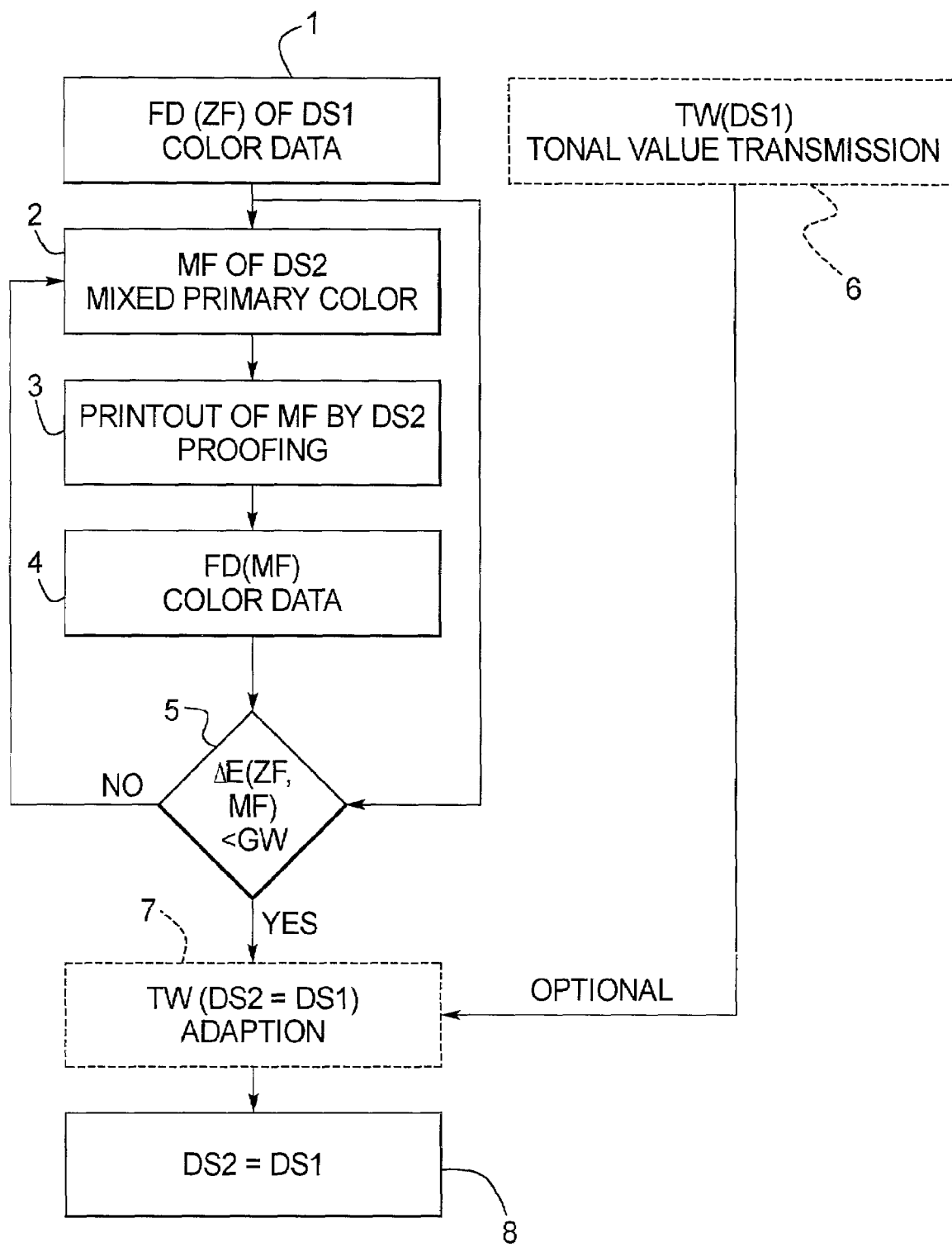
FIG. 1 is a flowchart of the color matching method.

For the purposes of promoting an understanding of the principles of the invention, reference will now be made to the preferred embodiment illustrated in the drawings and specific language will be used to describe the same. It will nevertheless be understood that no limitation of the scope of the invention is thereby intended, such alterations and further modifications in the illustrated device, and/or method, and such further applications of the principles of the invention as illustrated therein being contemplated as would normally occur now or in the future to one skilled in the art to which the invention relates."

The printed results of different printing systems can be simulated with the method (called color matching method) by selecting suitable primary colors. For that purpose, the primary colors are designationally varied by color mixing; the result is a mixed primary color. The primary colors of the first printing system—the target primary colors—can thus be achieved.

It is expedient to employ the color data of the printed target primary color for the comparison to the primary color to be adapted.

The color matching method can be particularly utilized in known electrophotographic printer devices wherein toner is employed for the inking.

The result that is achieved can be improved further in that the tonal value transmission of the first printing system is taken into consideration in the color matching method.

The setting of the mixed primary colors in the second printing system can occur by trials. It is more advantageous, however, when a computer-supported color recipe method is employed, this being described below.

Advantages of the method are:

It is possible to simulate the color reproduction of a first printing system with the same CMYK database. Color data of images need not be individually adapted to the specific conditions of the first printing system.

solid tones of the colors can be printed as actual solid surfaces and need not be approximated by rastering in superimposed printing (→fewer color fluctuations are the result).

The color reproduction corresponds to the first printing system even given divergent printing conditions and printed materials.

Involved characterizations of device can be eliminated.

Figure 2:
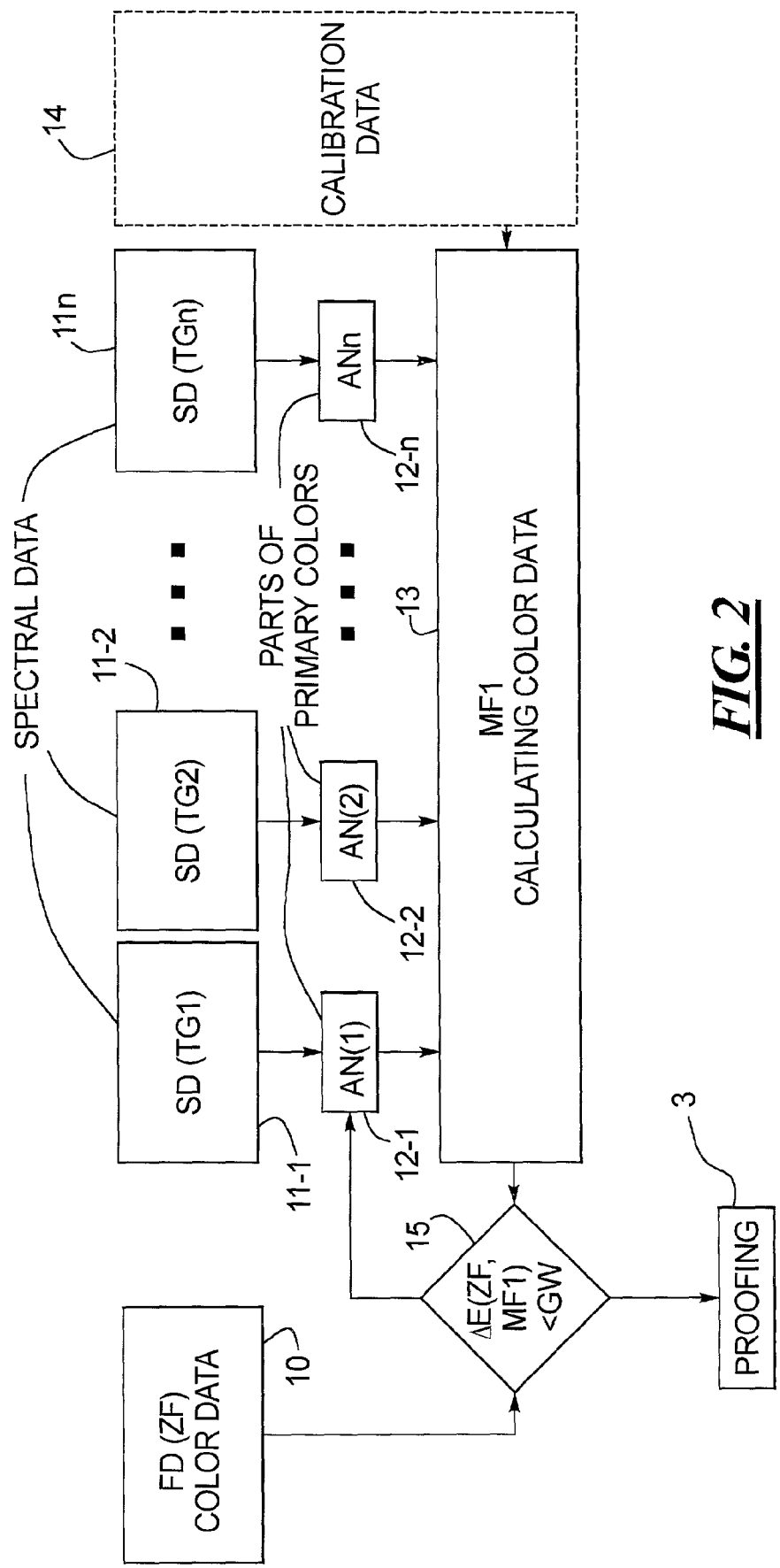
FIG. 2 is a flowchart of a color recipe method that can be advantageously employed in the color matching method.
Figure 3:
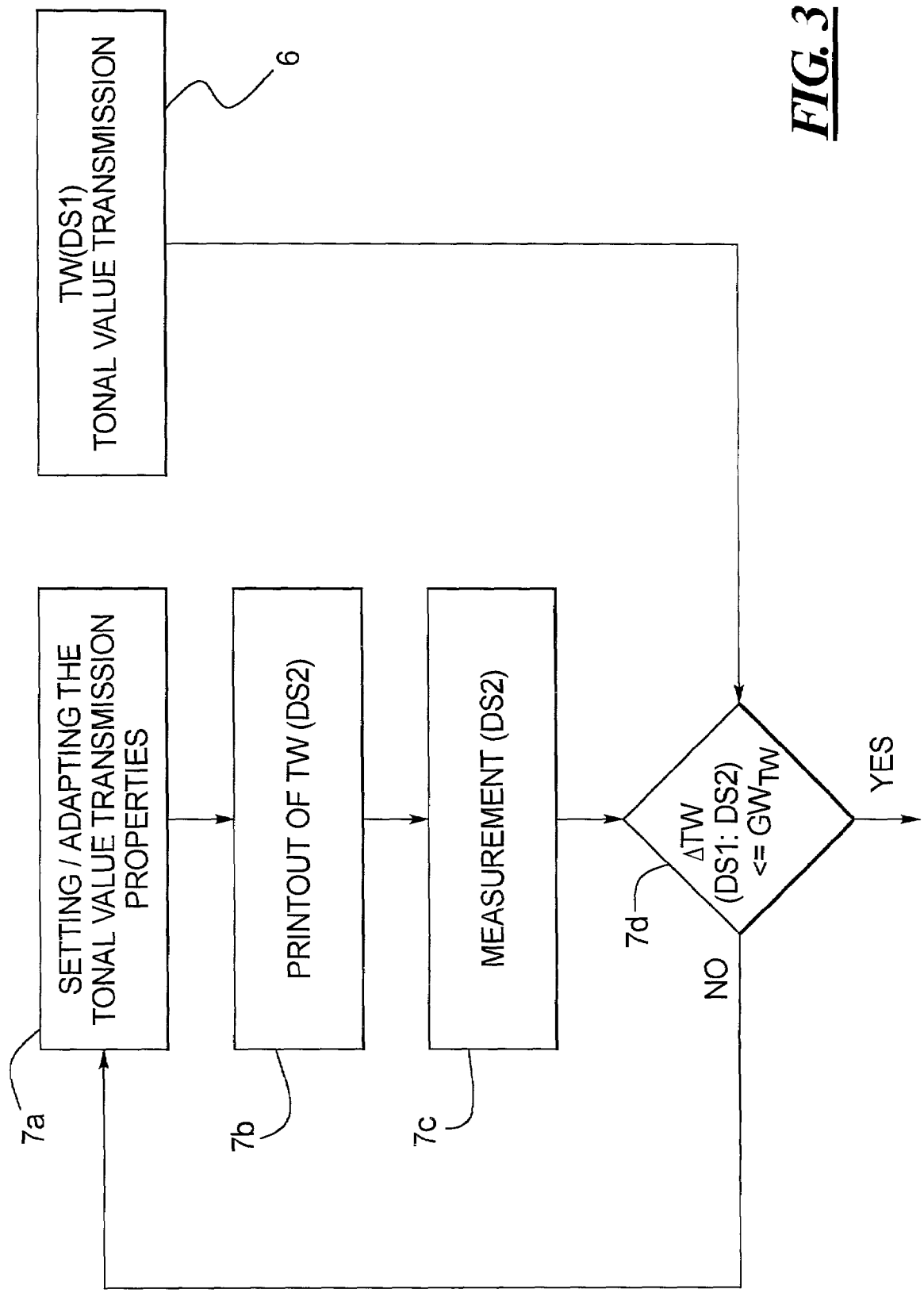
FIG. 3 is a flowchart that illustrates the adaptation of the tonal value transmission properties of the second printing system to those of the first printing system.

The individual method steps are represented by blocks in the flowcharts in FIGS. 1, 2 and 3.

Explanation of FIG. 1:

In the first step (block 1), the color data FD of the primary colors ZFk (k=1 . . . m)—the target primary colors ZFk—of a first printing system DS1 are identified. For example, the primary colors C, M, Y, K can be employed as target primary colors ZFk in the first printing system DS1. It is expedient to employ the color data of the printed target primary color.

Subsequently, the primary colors MFi (i=1 . . . n) of a second printing system DS2 are respectively set to a start value (block 2). As a starting point, the second printing system DS2 can employ the unmixed primary colors C, M, Y, K or mixed colors.

In the next step (block 3), the primary colors MF are printed out with the second printing system DS2, and the color data FD(MFi) of the printed primary colors MFi are then determined (block 4).

By comparing the color data of the primary colors MFi of the second printing system DS2 and the corresponding target primary colors ZFk, a determination is made as to whether there is adequate similarity between the primary colors being investigated, i.e. the difference is below a prescribed criterion, for example a tolerance limit GW (block 5). When this is not the case, the step according to block 2 is re-implemented, the primary color MFi to be adapted is reformulated, i.e. at least one of the further primary colors is mixed into the primary color to be adapted, which is now referred to as mixed primary color MFi. It is possible in the color matching to designationally select only the primary colors that deviate from the corresponding primary color of the printing system 1, for example only magenta.

Subsequently, the steps of blocks 3, 4, 5 are implemented until the prescribed criterion is met, for example the difference between the color data falls below the tolerance limit GW. When all primary colors MFi have been adapted to the corresponding target primary colors ZFk, the printing system DS2 has been adapted to the first printing system with respect to the color reproduction (block 8). Instead of prescribing a tolerance limit GW as criterion, it is also possible to define the plurality of passes (iterations) that are implemented for the color matching. The color matching method can be ultimately ended when no further improvement of the color matching derives in further iterations.

Explanation of FIG. 2:

The formulation of the mixed primary colors MF (block 2) can occur by means of test mixtures. It is more advantageous, however, to employ the formulation method that is shown in the flowchart according to FIG. 2 and described below. Only the primary colors of the second printing system DS2 that deviate from the primary colors of the first printing system DS1 are thereby formulated. A result of the formulating method is that a mixed primary color that is adequately approximated to the corresponding target primary color of the first printing system DS1 is calculated for the primary color to be adapted.

Upon employment of a standard computer, the formulating method determines the mixing ratio of the mixed primary color MF that is mixed from individual primary colors and is to be adapted to the target primary color ZFk.

Before the implementation of the formulations, the primary colors should be printed on a reference paper in a defined layer thickness with the corresponding printing system. The spectral data of the primary colors in full tones can be determined from the sample prints with the assistance of spectral color measurement.

Test impressions of a few mixtures having known composition can also be utilized for setting optional formulating parameters (of calibration data). The setting of the parameters then occurs by comparing calculated and measured color data of the mixed primary colors in that the deviations are minimized by variation of the parameters with a standard optimization method.

The measured color data FD(ZF) of the target primary colors ZFk of the first printing system DS1 form the point of departure (block 10).

A mixed primary color MFi for the individual primary color TGi to be adapted is calculated (block 13) from parts ANi (i=1 . . . n; blocks 12(i)) of the primary colors TGi (i=1 . . . n) of the second printing system DS2, namely upon employment of their spectral data SD(TGi) (blocks 11(i)). The spectral data SD(MFi) of the mixed primary color MFi obtained are determined according to the following equation:

$$R_{mix}(\lambda) = x \cdot R_{subtr}(\lambda) + (1-x \cdot R_{add}(\lambda))$$

with:

x share of the subtractive color mixing in the overall color mixing $R_{subtr}(\lambda)$ spectral reflection factor of the mixed primary color calculated according to the laws of subtractive color mixing $R_{add}(\lambda)$ spectral reflection factor of the mixed primary color calculated according to the laws of additive color mixing $R_{mix}(\lambda)$ spectral reflection factor of the calculated mixed primary color The share of the subtractive color mixing x can be suitably selected for every printing system; calibration mixtures can thereby be utilized.

Additive and subtractive color mixing is utilized (block 13) in the color calculation. The equations for the additive and subtractive color mixing derive from:

Additive Color Mixing $$R_{add}(\lambda) = \sum_i R_i(\lambda) \cdot c_i$$

with $c_i$ concentration of the respective primary color
$R_i(\lambda)$ spectral reflection factor of the respective primary color when it is printed alone as full surface.

Subtractive Color Mixing $$R_{subtr}(\lambda) = \prod_i R_i(\lambda)^{c_i}$$

with:

$c_i$ concentration of the respective primary color
$R_i(\lambda)$ spectral reflection factor of the respective primary color when it is printed alone as full surface.

In order to improve the result, calibration data from test mixtures can be consulted in the calculation of the mixed primary color MFi (block 14 shown with broken lines). For example, the following are included among the calibration data:

A gloss correction (for example, according to Saunderson):

$$R = K_1 + \frac{(1-K_1) \cdot (1-K_2) \cdot R_{intern}}{1 - K_2 \cdot R_{intern}}$$

or inversely:

$$R_{intern} = \frac{R - K_1}{1 - K_1 - K_2 + K_2 \cdot R}$$

with $K_1$ reflection coefficient for directed light at the boundary surface at the transition from air→color layer.

$K_2$ reflection coefficient for diffuse light at the boundary surface at the transition from color layer→air.

$R_{intern}$ reflection factor effective in the color layer

R external reflection factor observed from the outside (Billmeyer, F. W.; Saltzman, M., Principle of Color Technology, New York, John Wiley & Sons Inc., 2000, Berns, R. S. (editor), $3^{rd}$ edition, page 165)

The ratio of additive or subtractive color mixing proceeding from test impressions with known ratio and the optimization thereof.

A layer thickness correction $$R_{mix}(d,\lambda) = y \cdot [x \cdot R_{subtr.}(\lambda)^{d1} + (1-x) \cdot R_{add}(\lambda)^{d1})] + (1 x \cdot R_{subtr.}(\lambda)^{d2} + ((1-x) \cdot R_{add}(\lambda)^{d2})]$$

Given different printing materials, these can be taken into consideration by means of a color correction, for example $$R_{mix,P2}(\lambda) = \frac{R_{P2}(\lambda)}{R_{P1}(\lambda)} R_{mix,P1}(\lambda)$$

The spectral data SD(MFi) of the mixed primary color MFi are converted according to standard methods, for example into CIELAB standard color values FD(MFi).

A comparison of FD(ZF) to FD(MFi) is then implemented (block 15), for example according to $$\Delta E^*_{ab} = \sqrt{(L^*_{MFi} - L^*_{zf})^2 + (a^*_{MFi} - a^*_{ZF})^2 + (b^*_{MFi} - b^*_{ZF})^2}.$$

When the comparison of the color data FD of the target primary color ZF and the mixed primary color MF to be adapted yields no identity or when the difference between the color values ΔE* remains, for example, above a prescribed tolerance limit, for example GW=2 (ΔE*>GW), then the parts ANi of the primary color TGi are modified until the comparison (block 15) of the color data FD shows that the above tolerance limit GW has been reached. Instead of the employment of a tolerance limit GW as a criterion of the abort, the plurality of iterations can also be defined or the method can be ended when further passes no longer yield any improvement in the matching of the color values.

One then continues with the steps following block 3 in FIG. 1 with the calculated mixed primary color MFi.

The color matching method is explained in brief with reference to an example. Let, for example, the magenta of the first printing system DS1 be highly reddish. The second printing system employs, for example, a highly bluish magenta. In order to adapt the second printing system DS2 to the first printing system DS1, red is added to magenta via the formulating method (FIG. 2) until the color difference lies below the tolerance limit.

Explanation of FIG. 3

In order to improve the result of the color matching further, the tonal value transmission TW(DS2) of the second printing system DS2 can be optionally adapted (block 7) to the (TW(DS1) of the first printing system DS1. For that purpose, the tonal value transmission of the first printing system DS1 is identified (block 6) in a known way (ISO 12647-2, 1996 graphic technology—process control for the manufacture of half-tone color separations, proof and production prints—Part 2: offset lithographic processes).

The execution of the tonal value matching (block 7) is shown in detail in FIG. 3. The tonal value transmission properties TW(DS1) of the first printing system DS1 are identified (block 6); those (TW(DS2)) of the second printing system DS2 are set (block 7a). Subsequently, the tonal values TW(DS2) of the printing system DS2 are printed out (block 7b) and measured (block 7c). Finally, the tonal values of the two printing systems DS1 and DS2 are compared to one another (block 7d). Given equality or, respectively, when a prescribed criterion is met, for example a tolerance limit GW(TW) is not exceeded, one continues with the step block 8. Otherwise, the tonal value of the second printing system DS2 is modified, and the steps block 7b, 7c, 7d are implemented until the comparison meets the criterion.

The tonal value properties of the first printing system DS1 are acquired by proofing the tonal value gradations (for example, in 105 steps), as are those of the second printing system DS2. The gradation of the tonal values of the printing system DS2 is modified until the gradation corresponds to that of the printing system DS1.

For example, the CMYK colors (cyan, magenta, yellow, black) and RGB colors (red, green, blue) and transparent can be employed as primary colors for formulating suitable C, M, Y, K for multi-color printing.

Labeling of Blocks in the Drawing Figures

Block Label

1 color data (FD(ZF)) of the target primary colors (ZF) of the first printing system DS1

2 formulating the primary colors of the second printing system DS2 to a mixed primary color (MF)

3 proofing the primary colors of the second printing system DS2

4 color data FD(MF) of the printed mixed primary colors of the second printing system DS2

5 comparing color data FD(ZF) to FD(MF)

6 tonal value transmission (TW) of the first printing system DS1)

7 adaptation: tonal value transmission of DS1 to DS2

7a setting the tonal values TW of DS2

7b printout of the tonal values TW of DS2

7c measuring the tonal values of DS2

7d comparing the tonal values of DS1 and DS2

8 DS2=DS1

10 color data FD(ZF) of the target primary color ZF

11(i) spectral data SD(TGi) of the primary colors TGi

12(i) parts ANi of the primary colors TGi

13 calculating the color data FD(MF) of the mixed primary color MF 14 calibration data
15 comparing FD(ZF) to FD(MF)

While a preferred embodiment has been illustrated and described in detail in the drawings and foregoing description, the same is to be considered as illustrative and not restrictive in character, it being understood that only the preferred embodiment has been shown and described and that all changes and modifications that come within the spirit of the invention both now or in the future are desired to be protected.

I claim:

1. A method for adapting primary colors printed by a second printing system to target primary colors printed by a first printing system, comprising the steps of:
   a) determining color data of the printed target primary colors of the first printing system;
   b) setting primary colors of the second printing system;
   c) printing out the primary colors by the second printing system;
   d) measuring color data of the printed primary colors of the second printing system;
   e) making a determination as to whether the color data of the printed target primary colors of the first printing system coincide with the color data of the printed primary colors of the second printing system;
   f) given deviation of the color data of individual ones of the printed primary colors of the second printing system from the color data of the printed target primary colors of the first printing system, modifying to respective mixed primary colors respective primary colors of the second printing system corresponding to the respective individual ones of the printed primary colors deviating from the printed primary target colors of the first printing system; and
   g) implementing steps b)–f) until the one or more deviations meet a prescribed criterion.

2. The method according to claim 1 wherein the color data of the corresponding printed target primary color are employed for comparison to the mixed printed primary color of the second printing system.

3. The method according to claim 1 wherein:
   a tonal value transmission of the first printing system is determined; and
   after determining matching of the color data of the printed primary colors of the second printing system to the color data of the printed target primary colors of the first printing system, a tonal value transmission of the second printing system is matched to the tonal value transmission of the first printing system.

4. The method according to claim 1 wherein the setting of the individual primary colors of the second printing system occurs in that parts of other primary colors are mixed to the primary color to be adapted to form said mixed primary color, and wherein the following, further steps are provided:
   a) upon employment of measured spectral data of the primary colors, respective parts of the primary colors are selected and spectral data of the mixed primary color that is obtained and its color data are calculated therefrom;
   b) the color data of the mixed primary color and of the target primary color are compared to one another; and
   c) given non-satisfaction of a prescribed criterion in the comparison of the color data of the target primary color and the mixed primary color to be adapted, individual parts of the primary colors are modified until the prescribed criterion has been met.

5. The method according to claim 4 wherein the calculation of the spectral data of the mixed primary color occurs with assistance of additive and subtractive color mixing.

6. The method according to claim 5 wherein a ratio of the additive and subtractive color mixing is determined by optimization upon employment of reference specimens having known recipes.

7. The method according to claim 4 wherein the calculation of the spectral data of the mixed primary color takes a layer thickness of the mixed primary color into consideration.

8. The method according to claim 4 wherein a gloss correction is implemented in the calculation of the mixed primary color.

9. The method according to claim 4 wherein a printing material employed by the printing system is taken into consideration in the calculation of the mixed primary color.

10. The method according to claim 1 wherein the criterion is met when a deviation of the color data lies below a prescribed tolerance limit.

11. The method according to claim 1 wherein the criterion is met when a defined plurality of iterations have been carried out.

12. The method according to claim 1, wherein the criterion is met when no improvement in matching of the color data of the printing systems occurs as a result of further iterations.

13. The method according to claim 1 wherein at least one of the color groups CMYK and RGB, and a transparent are employed as primary colors.

14. The method according to claim 1 wherein an electrophotographic printing system is employed as the second printing system.

15. The method according to claim 14 wherein primary toner colors are employed as the primary colors.

16. The method according to claim 1 wherein in a document, a print result is matched by adapting the primary colors to the primary colors employed in a comparison document.

17. A method for adapting primary colors printed by a second printing system to target primary colors printed by a first printing system, comprising the steps of:
   a) determining color data of the printed target primary colors of the first printing system;
   b) setting primary colors of the second printing system;
   c) printing out the primary colors by the second printing system;
   d) measuring color data of the printed primary colors of the second printing system;
   e) making a determination as to whether the color data of the printed target primary colors of the first printing system coincide with the color data of the printed primary colors of the second printing system;
   f) given deviation of the color data of individual ones of the printed primary colors of the second printing system from the color data of the printed target primary colors of the first printing system, modifying to respective mixed primary colors respective primary colors of the second printing system corresponding to the respective individual ones of the printed primary colors deviating from the printed primary target colors of the first printing system, mixed primary color comprising the individual one primary color mixed with other primary colors of the second printing system; and g) implementing steps b)–f) until the one or more deviations meet a prescribed criterion.

18. A method of claim 17 wherein an electrophotographic printing system is employed as the second printing system.

19. A method for adapting primary colors printed by a second printing system to target primary colors printed by a first printing system, comprising the steps of:
   a) determining color data of the printed target primary colors of the first printing system;
   b) setting primary colors of the second printing system;
   c) printing out the primary colors by the second printing system;
   d) measuring color data of the printed primary colors of the second printing system;
   e) making a determination as to whether the color data of the printed target primary colors of the first printing system coincide with the color data of the printed primary colors of the second printing system;
   f) given deviation of the color data of individual ones of the printed primary colors of the second printing system from the color data of the printed target primary colors of the first printing system, modifying to respective mixed primary colors respective primary colors of the second printing system corresponding to the respective individual ones of the printed primary colors deviating from the printed primary target colors of the first printing system;
   g) implementing steps b)–f) until the one or more deviations meet a prescribed criterion;
   h) the setting of the individual primary colors of the second printing system occurring in that parts of other primary colors are mixed to the primary color to be adapted to form said mixed primary color, and wherein the following, further steps are provided:
   upon employment of measured spectral data of the primary colors, respective parts of the primary colors are selected and spectral data of the mixed primary color that is obtained and its color data are calculated therefrom,
   the color data of the mixed primary color and of the target primary color are compared to one another, and
   given non-satisfaction of a prescribed criterion in the comparison of the color data of the target primary color and the mixed primary color to be adapted, individual parts of the primary colors are modified until the prescribed criterion has been met;
   i) the calculation of the spectral data of the mixed primary color occurring with assistance of additive and subtractive color mixing; and
   j) determining a ratio of the additive and subtractive color mixing by optimization upon employment of reference specimens having known recipes.

20. A method for adapting primary colors printed by a second printing system to target primary colors printed by a first printing system, comprising the steps of:
   a) determining color data of the printed target primary colors of the first printing system;
   b) setting primary colors of the second printing system;
   c) printing out the primary colors by the second printing system;
   d) measuring color data of the printed primary colors of the second printing system;
   e) making a determination as to whether the color data of the printed target primary colors of the first printing system coincide with the color data of the printed primary colors of the second printing system;
   f) given deviation of the color data of individual ones of the printed primary colors of the second printing system from the color data of the printed target primary colors of the first printing system, modifying to respective mixed primary colors respective primary colors of the second printing system corresponding to the respective individual ones of the printed primary colors deviating from the printed primary target colors of the first printing system;
   g) implementing steps b)–f) until the one or more deviations meet a prescribed criterion;
   h) the setting of the individual primary colors of the second printing system occurring in that parts of other primary colors are mixed to the primary color to be adapted to form said mixed primary color, and wherein the following, further steps are provided:
   upon employment of measured spectral data of the primary colors, respective parts of the primary colors are selected and spectral data of the mixed primary color that is obtained and its color data are calculated therefrom,
   the color data of the mixed primary color and of the target primary color are compared to one another, and
   given non-satisfaction of a prescribed criterion in the comparison of the color data of the target primary color and the mixed primary color to be adapted, individual parts of the primary colors are modified until the prescribed criterion has been met; and
   i) for the calculation of the spectral data of the mixed primary color taking a layer thickness of the mixed primary color into consideration.

21. A method for adapting primary colors printed by a second printing system to target primary colors printed by a first printing system, comprising the steps of:
   a) determining color data of the printed target primary colors of the first printing system;
   b) setting primary colors of the second printing system;
   c) printing out the primary colors by the second printing system;
   d) measuring color data of the printed primary colors of the second printing system;
   e) making a determination as to whether the color data of the printed target primary colors of the first printing system coincide wIth the color data of the printed primary colors of the second printing system;
   f) gIven deviation of the color data of individual ones of the printed primary colors of the second printing system from the color data of the printed target primary colors of the first printing system, modifying to respective mixed primary colors respective primary colors of the second printing system corresponding to the respective individual ones of the printed primary colors deviating from the printed primary target colors of the first printing system;
   g) Implementing steps b)–f) until the one or more deviations meet a prescribed criterion has been met;
   h) the setting of the individual primary colors of the second printing system occurring in that parts of other primary colors are mixed to the primary color to be adapted to form said mixed primary color, and wherein the following, further steps are provided:
   upon employment of measured spectral data of the primary colors, respective parts of the primary colors are selected and spectral data of the mixed primary color that is obtained and its color data are calculated therefrom, the color data of the mixed primary color and of the target primary color are compared to one another, and given non-satisfaction of a prescribed criterion in the comparison of the color data of the target primary color and the mixed primary color to be adapted, individual parts of the primary colors are modified until the prescribed criterion has been met; and i) implementing a gloss correction in the calculation of the mixed primary color.

* * * * *